United States Patent [19]
Massena et al.

[11] Patent Number: 6,035,119
[45] Date of Patent: Mar. 7, 2000

[54] METHOD AND APPARATUS FOR AUTOMATIC GENERATION OF TEXT AND COMPUTER-EXECUTABLE CODE

[75] Inventors: Jay Loren Massena, Seattle; C. Douglas Hodges, Redmond, both of Wash.

[73] Assignee: Microsoft Corporation, Redmond, Wash.

[21] Appl. No.: 08/959,300

[22] Filed: Oct. 28, 1997

[51] Int. Cl.[7] ...................................................... G06F 9/45
[52] U.S. Cl. .............................................................. 395/701
[58] Field of Search ............................................. 395/701

[56] References Cited

U.S. PATENT DOCUMENTS 5,938,781   8/1999   Proskauer ................................ 714/724

OTHER PUBLICATIONS

Chris Kinsiman, "Create Design–Time Controls for the Web", Visual Basic Programmer's Journal, pp. 34–41, Oct., 1997.
Lewandowski. Frameworks for Component–Based Client/Server Computing. ACM Computing Surveys, vol. 30, No. 1, pp. 3–27, Mar. 1998.
Liang et al. Dynamic Class Loading in the Java Virtual Machine. ACM. pp. 36–44, Oct. 1998.
Hewitt. Visual InterDev 6.0, EXE Vol. 13, No. 4, pp. 33–38, Sep. 1, 1998.
Volgel. Create Design–Time Controls With VB. VBPJ Windows NT Enterprise Development. pp. 98–100, 1998.
Spencer. Stepping Up to Visual InterDev 6.0. Visual Basic Programmer's Journal, pp. 101–105, Sep. 1, 1998.
Butler. Supercharge VB's Forms With ActiveX. Visual Basic Programmer's Journal on–line, Feb. 1999.

*Primary Examiner*—Tariq R. Hafiz
*Assistant Examiner*—Wei Zhen
*Attorney, Agent, or Firm*—Banner & Witcoff, Ltd.

[57] ABSTRACT

The present invention provides a method, apparatus, and medium for adding text and text-based components to a Web page hosted on a server. A control, which is run at the designing time of the web page (design-time), when implemented, writes HTML information to a created web page. The created HTML information may include text and other text based components (client and server scripting, applets, ActiveX controls, Java scripting, and other components). Through the use of OLE, the controls incorporate author-friendly capabilities including in-place editing, property sheets, and persistence. Through the use of these controls, authors may automate the web page generation process and eliminate redundant coding.

25 Claims, 5 Drawing Sheets

METHOD AND APPARATUS FOR AUTOMATIC GENERATION OF TEXT AND COMPUTER-EXECUTABLE CODE

BACKGROUND OF THE INVENTION

1. Technical Field

In general, the present invention relates to authoring of text and computer-executable code, and more particularly to techniques for automatically generating HTML text and script within web pages.

2. Related Information

In recent years, the Internet has experienced tremendous growth. It's rapid development has resulted in a growing number of new uses of the Internet and its graphical component, the World Wide Web (the Web). In particular, advances in providing richer, faster and more interactive web sites have contributed to this growth of the Internet as users have become more discriminating in which sites to visit. To attract these users, commercial and corporate Internet site authors attempt to stay ahead of their competition in providing compelling, informative, and useful sites for users and potential customers.

As hypertext markup language (HTML) has enabled the growth of the Internet, corporate users have also expanded the application of HTML to intranet applications as well. In this area as well, authors have strived to enable efficient creation and use of internal web sites while minimizing design-time.

One such example of the improvements in Web technology are dynamic web pages which can provide updated information to the user when the web page is downloaded. For example, dynamic web pages may be used to provide time of day information, table of contents information and searching capabilities of the web site. One common way of providing these dynamic web pages is the use of WebBot components found in the FrontPage web page authoring and management software (from the Microsoft Corporation of Redmond, Wash.). WebBot components may comprise run-time scripts or pointers to additional pages. WebBots, which can be dynamic components, when activated, process information present on the FrontPage web at the time that the WebBots components were activated and may generate HTML text on the web page. WebBot components are implemented using a dynamic link library (DLL).

WebBot components, however, are limited in that they cannot take advantage of property browsers and property pages. In addition, certain WebBot components require FrontPage Server Extensions on the web server in which the FrontPage web is published. While the advanced WebBot components perform dynamic processing when the web page is requested, only servers which have the FrontPage Server Extensions may perform this processing.

Java applets and certain web browser plug-ins may also be implemented to provide dynamic web pages. However, in a simpler form, Java applets and web browser plug-ins are limiting in that they must be written in only certain programming languages.

Dynamic web pages may also be provided using ActiveX controls developed by Microsoft Corporation of Redmond, Wash. ActiveX controls are a popular and effective way of encapsulating functionality and distributing this functionality across a variety of platforms. Unlike, Java applets and certain plug-ins, ActiveX controls may be written in any number of programming languages. ActiveX controls are based on OLE controls or OCX controls and are components (or objects) which can be inserted into a web page or other application to reuse packaged functionality which someone else programmed. For example, Microsoft's Internet Explorer 3.0 contains ActiveX controls which allow users to enhance web pages with sophisticated formatting features and animation. ActiveX controls are an enhancement over Java applets and certain web browser plug-ins since ActiveX controls may also be used in applications written in any number of programming languages. Hundreds of ready to use ActiveX controls are now available with functionality ranging from a timer control (which simply notifies the system at a particular time) to full-featured spreadsheets and words processors. Web authors may also write their own ActiveX controls using Visual Basic 5.0 or Visual C++ and an ActiveX control framework such as Microsoft Foundation Class Library (MFC), the ActiveX Template Library (ATL), or the BaseClt framework. ActiveX controls are designated within a web page by use of a standard HTML <OBJECT> tag. Typically, object tags include a set of parameters which include name value pairs, which are the persistence information of the control. The object tag includes a set of parameters that specify which control should be used and control the appearance and behavior of the control.

ActiveX controls currently, however, only are compatible with Internet Explorer (IE) web browsers (by the Microsoft Corporation). While developers desire to use the encapsulation and distribution advantages of ActiveX controls, they may wish their developed code to run in browsers other than Internet Explorer. Developers are faced with a dilemma: to author full, rich code using all the features of ActiveX controls while limiting the end use of the controls to only Internet Explorer or to author simple code which can run on a variety of browsers. ActiveX controls are also limiting in that they cannot author HTML and script in a web page. Web developers must author HTML and script themselves to provide certain features on a web page. Further, the HTML and script must be authored in alternative representations in order to accommodate all types of web browsers. This forces web page authors to become experts in the capabilities and needs of all web browsers.

SUMMARY OF THE INVENTION

Many of the aforementioned problems are solved by providing a method and apparatus for authoring text and computer-executable code. In one embodiment of the present invention, the present invention is a tool for web developers which automatically generates HTML text and script onto a web page. Under this embodiment, a developer when designing a web page inserts a control into the web page. When the file is saved, the editor or container asks the control for both its design-time information as well as its run-time HTML text and run-time script which should be written into the file. The design-time information of the control is then rendered invisible to the run-time user by being wrapped inside an HTML comment. The control is thereby made invisible to any downstream processor that respects HTML comments such as web browsers. In an alternative embodiment, the design-time information may be filtered out prior to processing the run-time information. This filter may also be referred to as stripping the design-time information of the control out of the web page when forwarded to the run-time platform. The present invention may be implemented within any system to generate text and/or script. For example, the present invention may be used to generate C++ code in a C++ development environment.

Advantageously, in one embodiment, the present invention allows developers to design web pages that can be accessed by web browsers regardless of their handling capabilities such as ActiveX or HTML only. In addition, processing is performed when the files are saved rather than when the file is accessed by the web browser.

In one application, the present invention generates HTML script and Active Server Page (ASP) code that is inserted into an ASP page. In this case, the control is stripped from the file when the file is processed for delivery to a web browser.

In one embodiment, the present invention uses a Component Object Model (COM) component thereby allowing the controls to be utilized across multiple applications. The controls may be, for example, ActiveX controls that automatically generate HTML text and script when the file is saved. The controls may be written using any development tool including, but not limited to, Visual C++ 5.0, Visual Basic 5.0, Borland Delphi or C++, and Symantec C++. Advantageously, the present invention may be implemented within any type of HTML editor, including but not limited to, FrontPage and Visual InterDev editors.

The present invention may be utilized in applications which requires complex or lengthy scripting thereby alleviating the burden on developers or programmers. The programmer also does not need to know all of the calls for scripting since the control of the present invention can perform the necessary scripting. Such applications may be for example, applications incorporating complex database controls.

Design-time controls are similar to embedded wizards that can be continuously edited to modify the text they generate for a web page. DTCs take advantage of OLE design-time capabilities (including direct manipulations, property sheets, and persistence) to capture user inputs, thereby extending the capabilities of an editor which supports design-time controls.

As used herein, a persist operation refers to writing information to a non-volatile storage medium where the information relates to the current state of an object. The information written is sufficient so that, when the object is recreated in memory, the object can be restored to its previous state.

As used herein, an instantiate operation refers to creating an instance of an object type in memory.

As used herein, italicized text relates, generally, to interfaces and methods (or functions) as present in COM. An interface in COM is a description of related methods one can call on an object. For example, the following term "IInterface::IMethod(Argument1, Argument2)" relates to a COM interface "Interface" with an associated method "Method" using the arguments Argument1 and Argument2.

These as well as other novel advantages, details, embodiments, features and objects of the present invention will be apparent to those skilled in the art from following the detailed description of the invention, the attached claims and accompanying drawings, listed herein, which are useful in explaining the invention.

BRIEF DESCRIPTION OF THE DRAWINGS

In the following text and drawings, wherein similar reference numerals denote similar elements throughout the several views thereof, the present invention is explained with reference to illustrative embodiments, in which.

DETAILED DESCRIPTION OF THE PREFERRED EMBODIMENTS

The present invention is described as it would be used for Internet applications, which is one embodiment of the invention. The present invention, however, may be implemented generally within any number of computer applications including generally any software development tool for the authoring of text and computer-executable code. In the context of developing web pages, the present invention provides web content developers a tool for authoring hypertext markup language (HTML) text and script. In this context, the present invention may be implemented within an authoring tool such as, for example, Visual C++, Visual InterDev and Visual J++ by Microsoft Corporation of Redmond, Wash.

Although not required, the invention will be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in personal computers (PCs), hand-held devices, multiprocessor systems, microprocessor-based or programmable consumer electronics, network PCs, minicomputers, mainframe computers, and the like.

Figure 1:
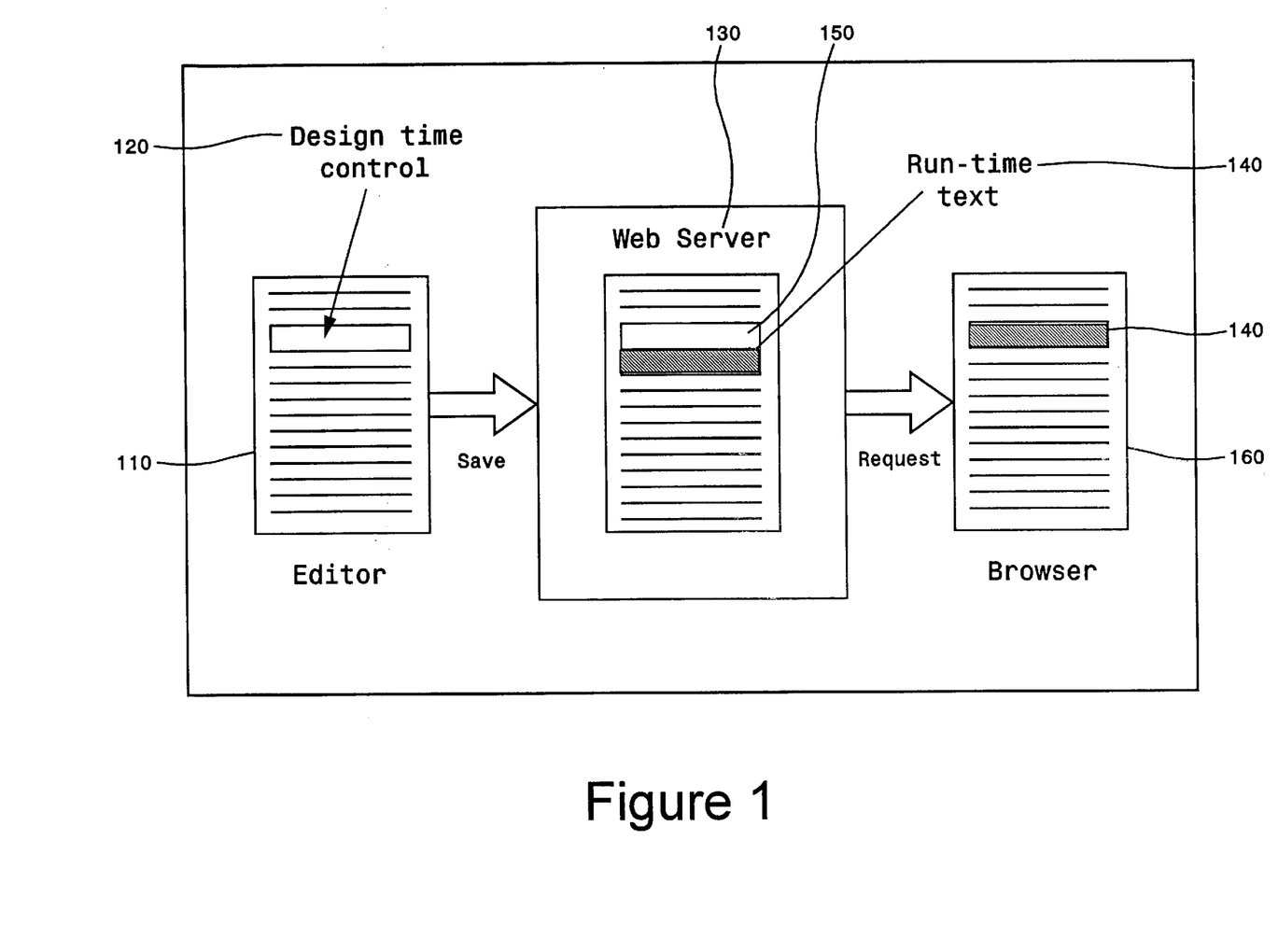
FIG. 1 is a schematic diagram depicting the general operation of the present invention in accordance with one embodiment of the invention.

FIG. 1 is a schematic diagram depicting the general operation of the present invention in accordance with one embodiment of the invention. A file 115 designating a web page may be developed using an editor 110. The present invention may be implemented by any number of editors presently available and future versions. Available editors include, for example, Visual InterDev and FrontPage (by the Microsoft Corporation). The developer may insert a design-time control 120 into the file 115 to provide a desired functionality to the web page. The design-time control 120 may be any control capable of generating text and/or computer-executable code. Such code or text may be generated when the file 115 containing the design-time control 120 is saved. Alternatively, it may be generated at other times including, for example, when the control 120 is inserted in the file 115 (or document depending on the application used). In one embodiment, the design-time control 120 is an ActiveX control that has an additional Component Object Model (COM) interface that generates HTML text and script.

When the developer wishes to save the file 115, the file 115 is typically saved on a web server 130 as web page 135.

When saved to web page 135, the file 115 in editor 110 is first processed to generate the appropriate run-time HTML text or script 140 in accordance with the design-time control 120. The design-time control 120 is then placed within an HTML comment 150 to render the design-time information of the control 120 invisible at run-time to the run-time process. The run-time text or script 140 may have any content including, but not limited to, server-side scripting intended to be consumed by Active Server Pages, client-side scripting to be consumed by a browser, HTML tags and content. When the web page 135 is retrieved by a web browser 160, only the run-time HTML text or script 140 is processed by the web browser 160. The design-time control 120 is ignored by the web browser 160 since it is wrapped inside the HTML comment 150. Alternatively, the web server 130 may filter or strip the HTML comment 150 from the web page 135 so that the design-time control 120 is prevented from being sent to the browser 160. The present invention thereby provides web site developers a convenient tool for authoring of dynamic web pages. The present invention provides developers controls which can be inserted into web pages to provide desired functionality. A developer may include previously designed design-time controls within a page thereby alleviating the burden on the developer from having to manually author all web page content. Repeatable web page content may be encapsulated into component objects which can be used to easily author desired text or related code. The design-time control allows this repeatable web page content to be componentized for later reuse. Through the execution of the design-time control during, for example, the saving process, the run-time text is created and the design-time control commented out. In addition, while previously developers were required to manually replicate their web content in alternative representations so as to accommodate all types of web browsers, with the present invention, developers may author web content and allow the replication of the alternative formats to be handled by the design-time controls.

Under one embodiment, when a web site developer is authoring a web page, namely during design-time, the present invention operates similar to ActiveX controls. Controls, in general, are reusable software components that can be embedded in the context of their container and contribute additional capabilities and user interface to their container. Controls may, for example, when embedded within a web page, present a graphical user interface within the area of the control (where located on the web page) when displayed on a browser. Controls are capable of handling their own drawing, accepting mouse and keyboard inputs, providing content menus and other functions which generally extend the graphical editing environment of a container. In addition, controls can use a property browser and property page frames of their container to allow the user to set properties of the control. Additionally, controls are predefined and installed programs which may be accessed by a variety of different applications.

Referring to design-time controls, the design-time control is then instantiated and initialized under techniques similar to that of ActiveX. The design-time control may be registered under similar procedures as other ActiveX controls. The controls of the present invention are similar to embedded wizards that can be continuously edited to modify the run-time text they generate for a web page. The controls take advantage of ActiveX control capabilities (including direct manipulation, property sheets, and persistence) to capture user inputs, thereby extending the capabilities of an editor which supports design-time controls.

Figure 2:
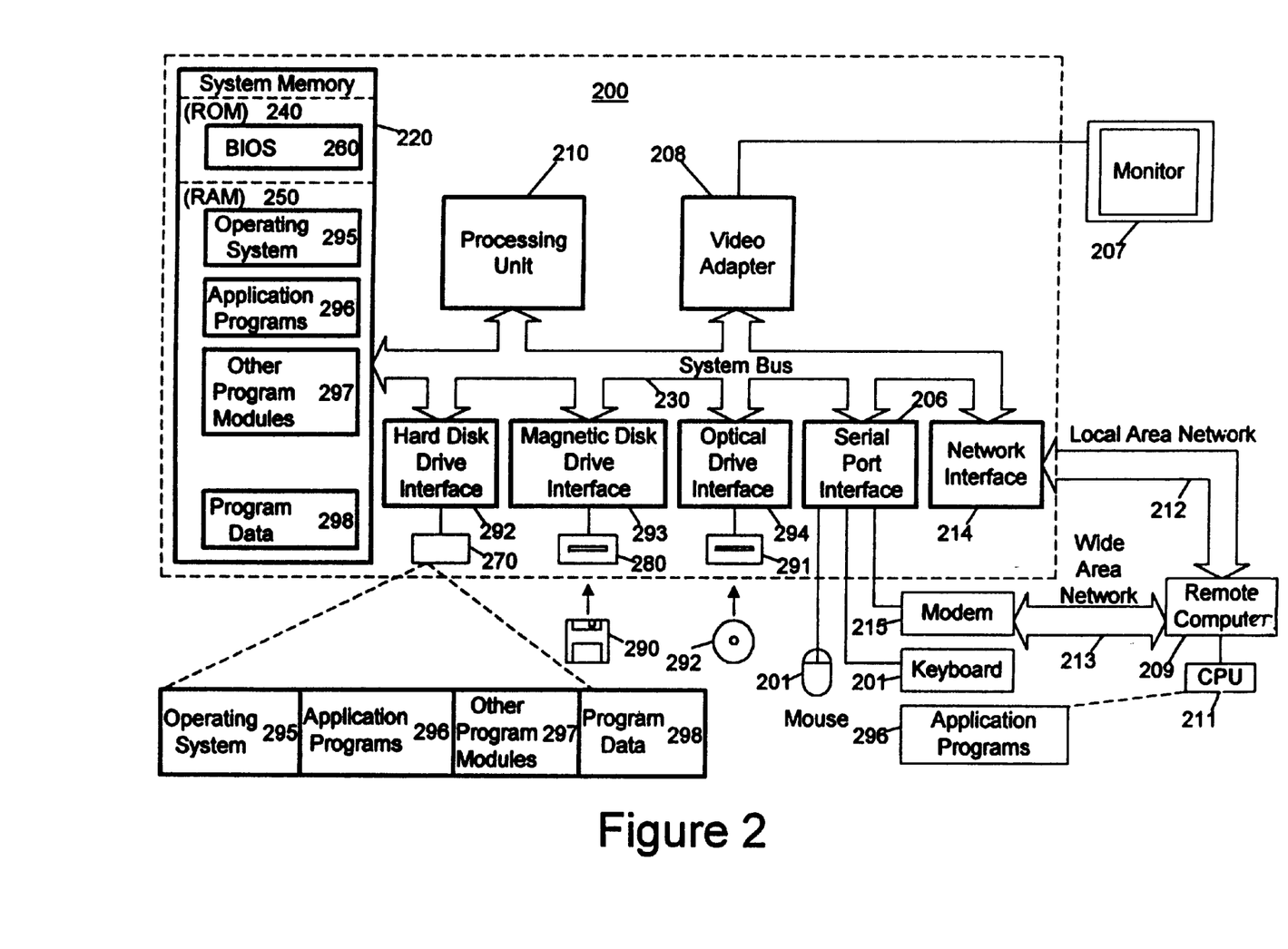
FIG. 2 is schematic diagram depicting a computing environment according to embodiments of the present invention.

FIG. 2 is a schematic diagram of an exemplary computing environment in which the present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB). A monitor 207 or other type of display device is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 2. The logical connections depicted in FIG. 2 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

Figure 3:
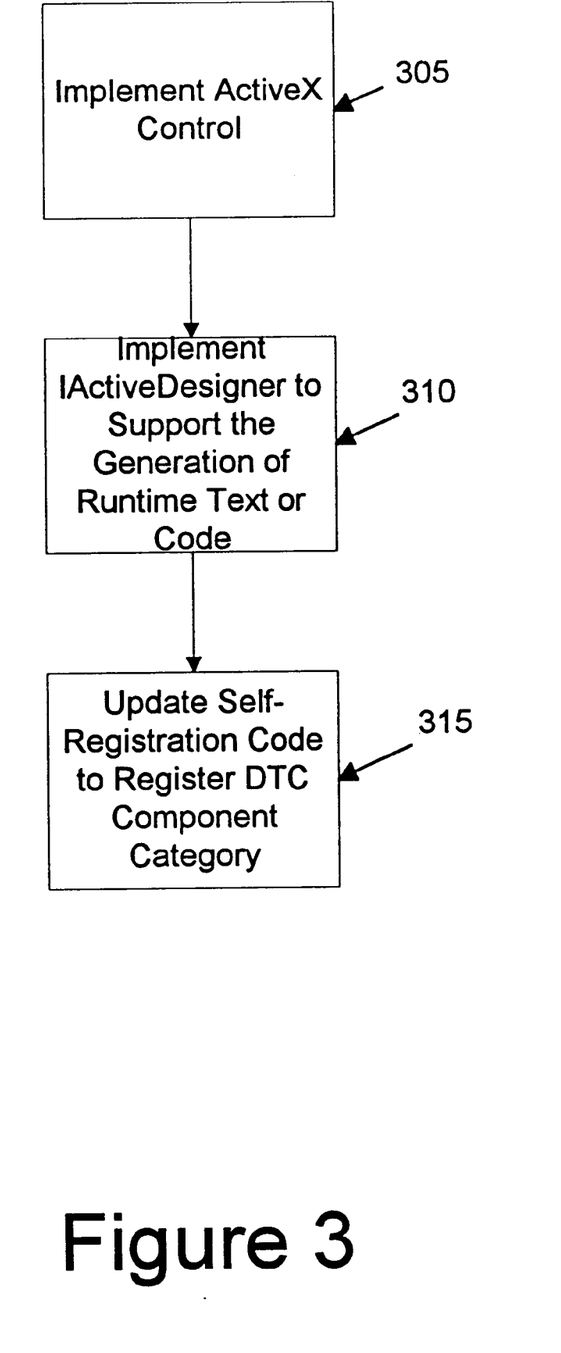
FIG. 3 is a flow chart describing the steps for creating a control according to an embodiment of the present invention.

FIG. 3 is a flow chart describing the general steps required in creating a design-time control. At 305, a developer implements a standard ActiveX control that supports the desired graphical user interface. At 310, IActiveDesigner is implemented to support the generation of run-time text. IActiveDesigner is more fully described in "Method for Designing and Componentizing Run-time Objects", filed Jun. 6, 1997, to Fraley et al., U.S. patent application Ser. No. 08/870,171, (Attorney Docket No. MS 79507/KS45928). This patent application is incorporated by reference for any and all essential subject matter.

Through the use of this interface, the design-time control may generate text for inclusion into a page. As all HTML content is based on text, the design-time control which controls the insertion of text has significant advantages, at least, as a tool for targeting text-using clients, independent of the type of client's browser.

One may use design-time controls to author any text-based solution including HTML tags and content, language-independent server and client scripting, Java applets, ActiveX controls, ActiveX server components and other text-based solutions. One embodiment of the invention includes third parties hosting design-time controls which are downloaded as needed to an author's editing environment.

For example, run-time text may take the following form:

```
Dim strText As String
Dim strQuote As String
strQuote=Chr$(34)
strText="<BGSOUND SRC=" & strQuote & lblsource.Caption & strQuote.
strText=strText & " LOOP=" & strQuote & Repeat & strQuote & ">"
RuntimeText = strText
```

The design-time control is then ready to be compiled. At step 315, the self-registration code of the computer system supporting the editor handling file 110 is updated to register the design-time control component category. The control may be installed, for example, in the computer system's registry so the control may be utilized and accessed across other applications.

Multiple methods exist for identifying a design-time control. For example, a running design-time control may be identified in the file by the host computer that performs a query interface (QI) operation for IActiveDesigner which then calls IActiveDesigner::Query PersistenceInterface to see if the control supports IID_IPersistTextStream. Alternately, the host computer may recognize that a given control's class ID, without instantiating the control, is a design-time control by checking to see if the control has registered the fact that the control implements the special component category, for example, CATID_WebDesigntimeControl in the registration database of the host computer under the control's CLSID section. A design-time control may be tagged with a CATID as described in the following sample code fragments:

```
// HandleComponentRegisration - registers the controls in this library as
// design-time controls.
HRESULT HandleComponentRegistration(BOOL fRegister)
{
    if (fRegister)
        return
RegisterControlCategory (CATID_WebDesigntimeControl,
            L"Web Design-time Control",
            (REFCLSID)CBGSndCtrl::guid);
        else
            return                  UnRegisterControlCategory
(CATID_WebDesigntimeControl,
(REFCLSID)CBGSndCtrl::guid);
}
////////////////////////////////////////////////////////////////////////
/////////////
// RegisterControlCategory : Register controls with catid
HRESULT RegisterControlCategory(CATID catid, WCHAR* wszDesc,
REFCLSID rClsid)
{
    ICatRegister* pcr = NULL ;
    HRESULT hr = S_OK ;
    hr = CoCreateInstance(CLSID_StdComponentCategoriesMgr,
        NULL, CLSCTX_INPROC_SERVER, IID_ICatRegister,
                                      (void**)&pcr);
    if (FAILED(hr))
    return hr;
    hr = CreateComponentCategory(pcr, catid, wszDesc);
    if (SUCCEEDED(hr))
        {
            CATID rgcatid[1];
            rgcatid[0] = catid;
            hr = pcr->RegisterClassImplCategories (rClsid, 1,
rgcatid);
        }
    pcr->Release( );
    return hr;
}
////////////////////////////////////////////////////////////////////////
/////////////
// UnRegisterControlCategory : Unregister controls with catid
HRESULT UnRegisterControlCategory(CATID catid, REFCLSID
rClsid)
{
    ICatRegister* pcr = NULL ;
    HRESULT hr = S_OK ;
    hr = CoCreateInstance(CLSID_StdComponentCategoriesMgr,
        NULL, CLSCTX_INPROC_SERVER, IID_ICatRegister,
                                      (void**)&pcr);
    if (FAILED(hr))
    return hr;
        CATID rgcatid[1];
        rgcatid(0) = catid;
        hr = pcr->UnRegisterClassImplCategories(rClsid, 1,
rgcatid);
    pcr->Release( );
    return hr;
}
////////////////////////////////////////////////////////////////////////
/////////////
// CreateComponentCategory : Create a COM Server Category
HRESULT CreateComponentCategory (ICatRegister* pcr, CATID
catid, WCHAR* wszCatDescription)
{
    HRESULT hr = S_OK ;
    // Make sure the HKCR\Component Categories\{. . .catid . . . } key
```

-continued

```
is registered
    CATEGORYINFO catinfo;
    catinfo.catid = catid;
    catinfo.lcid = 0x0409 ; // english
    // Make sure the provided description is not too long.
    // Only c6py the first 127 characters if it is
    int len = wcslen(wszCatDescription);
    if (len>127)
    len = 127;
    wcsncpy(catinfo.szDescription, wszCatDescription, len);
    // Make sure the description is null terminated
    catinfo.szDescription[len] = '\0';
    hr = pcr->RegisterCategories(1, &catinfo);
    return hr;
}
```

Figure 4:
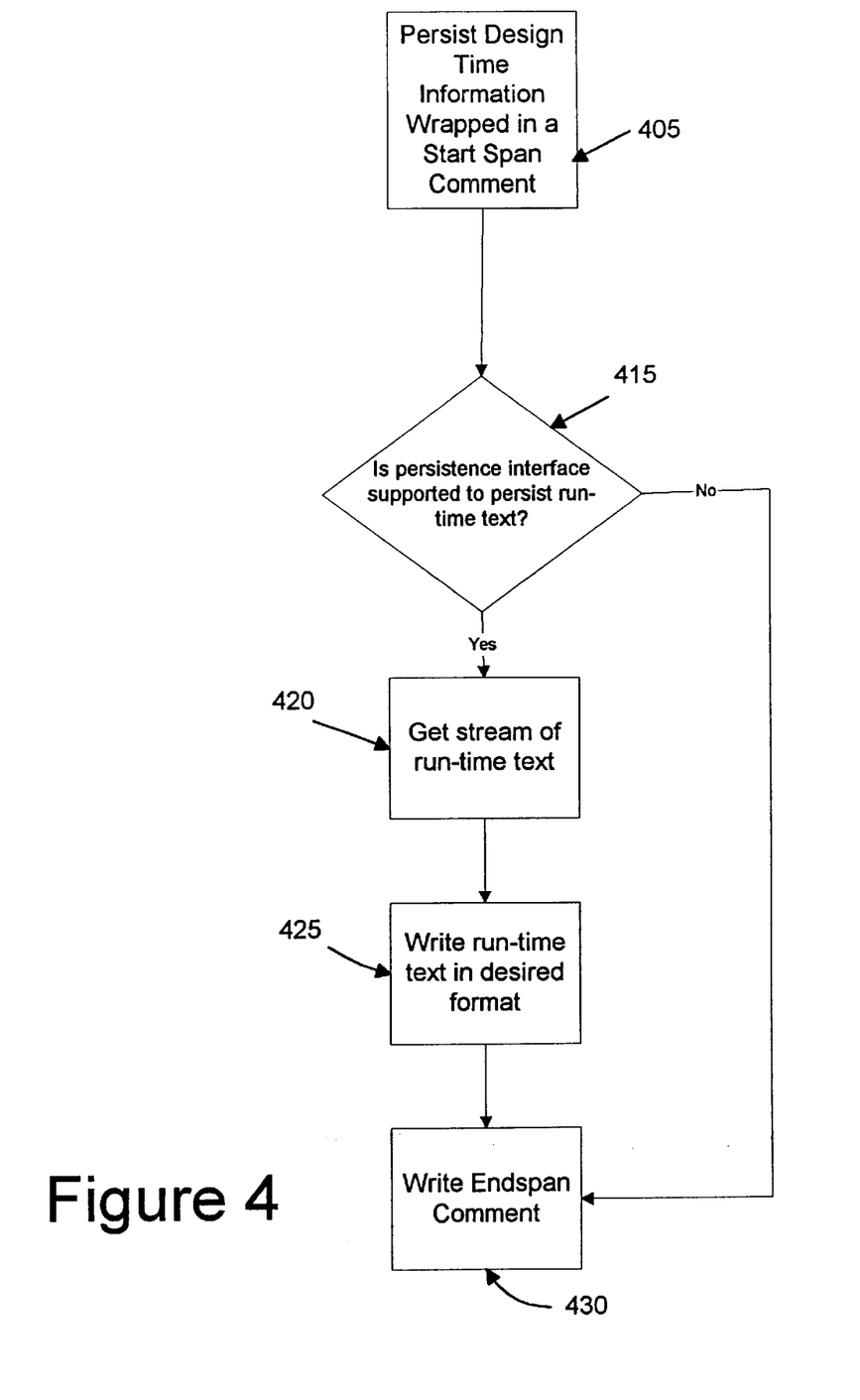
FIG. 4 is a flow chart describing the steps for saving a file having a control according to embodiments of the present invention.

After the developer has completed working on the file and later wishes to save the file, the design-time control is persisted (as defined above) within a metadata comment using a standard HTML object tag and is thereby made invisible for downstream run-time users. FIG. 4 is a flow chart describing the steps for saving a file or document having a design-time control. The process for saving a design-time control is initiated when an editor recognizes a design-time control resident in the file.

To assist future editors when reading a design-time control, the saving editor includes two terms, "startspan" and "endspan", so as to delineate the beginning and ending of the design-time control (see, for example, the following code fragment).

At step 405, the system persists the design-time information wrapped in a startspan comment, such as an HTML comment. During a save operation to persist the design-time control, the editor saving the file performs a Query Interface (QI) operation for the IActiveDesigner to determine if the object is a design-time control. If so, the object is wrapped with the design-time control metadata comment (<!--METADATA TYPE="DesignerControl" startspan -->) all on the first line. The OBJECT tag begins on the line following the metadata comment wherein the design-time information is inserted. For example, the design-time control may persist as follows within the HTML comment:

```
<!--METADATA TYPE="DesignerControl" startspan [attrib1,
attrib2.attribN]
<OBJECT>
. . .
</OBJECT>
-->
<H1>Hello World</H1>
<!--METADATA TYPE="DesignerControl" endspan (attrib1,
attrib2 . . . attribN] -->
```

At step 415, the persistence interface (the operation which stores the design-time control) is checked to determine whether it can handle persisting the run-time text in accordance with the design-time control information (for example, information relating to preferences selected when the design-time control was running in an editor). For example, a QI operation may be performed for IActiveDesigner followed by a call to IActiveDesigner::QueryPersistenceInterface to see if the control supports IID_IPersistTextStream. Alternatively, one of ordinary skill in the art, based on the invention disclosed herein, would recognize alternative ways of retrieving the run-time text from a design-time control. If the persistence interface cannot handle persisting the run-time text, then no run-time text is generated and the comment is terminated with only the design-time control within the comment (as shown by the branch to step 430).

If the persistence interface is capable of generating the run-time text, the editor gets a stream of run-time text from the design-time control at step 420. The run-time text may be generated by the editor, for example, by calling IActiveDesigner::SaveRuntimeState (IID_IPersistTextStream, IID_IStream, . . . ) and saving the run-time text after the startspan comment.

Run-time text is created within the file using a method that allows the system to retrieve the run-time text of the control. This method preferably allows for many types of controls that persist their state via any OLE persistence medium. The run-time text is written into an IStream medium and the text is UNICODE, in one embodiment. At step 425, the run-time text is formatted from its bitstream format into a desired format. The run-time text persists just below the above HTML-comment and is bracketed within another HTML comment (containing an endspan comment, described below).

It will be notes that the run-time text is capable of handling any number of run-time implementations, including but not limited to HTML tags, server components, Java applets, Netscape plug-ins, or script. At step 430, the design-time control is ended by a metadata comment that includes both the TYPE="DesignerControl" and the endspan attribute: (<!--METADATA TYPE="DesignerControl" endspan -->). The following depicts an example of the run-time text in relation to the design-time control as they are persisted within an HTML comment:

```
<!--METADATA TYPE="DesignerControl" startspan
<OBJECT ID=MyPageCounter
ClassID="clsid:2FA70250-9333-11CF-8F68-00AA006D27C2">
<PARAM Name="ImageStyle" Value="Odometer">
<PARAM Name="TextColor" Value="Yellow">
</OBJECT>
-->
<% Set MyPageCounter = Server.CreateObject(AXYZ.PageCounter@)
MyPageCounter.ImageStyle = 2
MyPageCounter.TextColor = Yellow
MyPageCounter. PageHits = Application("PageHits") %>
<IMG SRC=<%=MyPageCounter.ImageURL%>>
<!--METADATA TYPE="DesignerControl" endspan -->
```

One skilled in the art would recognize that other ways exist to demarcate the end of a run-time text. For example, the length of the run-time text stream may be stored in a header for the design-time control.

The following sample code fragment demonstrates how the run-time text of a design-time control may be saved:

```
HRESULT SaveRuntimeText( . . . IUnknown* pUnk . . . )
{
    IActiveDesigner *pActiveDesigner;
    HGLOBAL            hGlobal = NULL;
    IStream               *pStream = NULL;
    OLECHAR          *pstr;
    HRESULT          hr;
    hr = pUnk->QueryInterface( IID_IActiveDesigner,
(void**)&pActiveDesigner );
    if ( SUCCEEDED(hr) && pActiveDesigner )
    {
        hr = pActiveDesigner->QueryPersistenceInterface(
IID_IPersistTextStream );
        if ( SUCCEEDED(hr) )
        {
            hGlobal = GlobalAlloc( GMEM_MOVEABLE | GMEM_NODISCARD,
0 );
            if ( hGlobal )
            {
                hr = CreateStreamOnHGlobal( hGlobal, FALSE,
&pStream );
                if ( SUCCEEDED(hr) )
                {
                    hr = pActiveDesigner-
>SaveRuntimeState(IID_IPersistTextStream, IID_IStream, pStream
);
                    if ( SUCCEEDED(hr) )
                    {
                        OLECHAR chZero = 0;
                        ULONG cbWritten;
                        // Make sure the text has a null terminator
                        pStream->Write(&chZero, sizeof(chZero),
&cbWritten);
                        pstr = (OLECHAR *)GlobalLock( hGlobal );
                        if ( pstr )
                        {
                            TCHAR    *pch;
                            pch = MyOLE2T( pstr );
                            //. . . save out run-time text . . .
                            GlobalUnlock( hGlobal );
                        }
                    }
                    pStream->Release( );
                }
                GlobalFree( hGlobal );
            }
        }
        pActiveDesigner->Release( );
    }
    return NOERROR;
}
```

When a file having a design-time control is loaded for editing, metadata comments with TYPE="DesignerControl" are recognized as a special comment. If the startspan attribute is present, the first line of the comment is skipped. The following element which is the OBJECT tag is recognized and parsed and the object element is instantiated by the editor. Everything which follows </OBJECT> is read by the parser and skipped until a metadata comment with TYPE="DesignerControl" and the endspan attribute is found. As a result, any run-time text in the file is not parsed by the editor when the file is loaded. Any optional attributes following the startspan attribute are not required to be preserved by the editor. Once a server hosts a web page, the web page is ready for downloading to a client.

Figure 5:
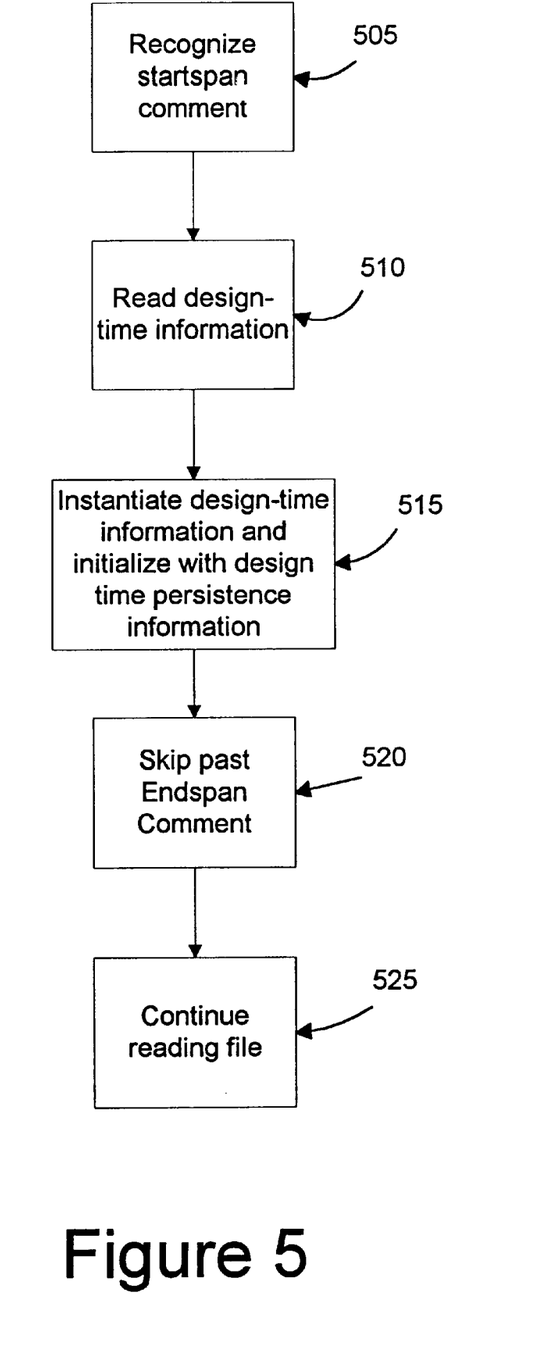
FIG. 5 is a flow chart describing the steps for loading a file having a control according to embodiments of the present invention.

If an author wishes to modify a saved page containing a design-time control, then the page needs to be converted back into an editable form. FIG. 5 is a flow chart describing the steps for loading a file or document having a design-time control. The loading of a design-time control is initiated at step 505 when a startspan comment of the design-time control is recognized. At step 510, design-time information is read. At step 515, the design-time information is instantiated and initialized with the design-time persistence information. At step 520, the process skips past the endspan comment. At step 525, remaining portions of the file are read. After this process, the file as containing the design-time control is now available for editing.

As described above, alternative methods exist for demarcating the end of a design-time control. For example, using the example given above, where the length of the design time control is stored in a header (instead of ending the HTML comment with the endspan term), an editor retrieving the file with the design time control would note the beginning of the design time control and the length of the run-time component and skip down the file until the editor has passed the length of code indicated in the header information.

In the case where the control is within an Active Server Page (ASP), the design-time control is prevented from being delivered to the client browser. When the Active Server (hosting the ASP) encounters a metadata comment, the server strips the comment from the file before processing, leaving behind only the run-time text generated by the design-time control. This occurs before the performance of any other logic, making the run-time text generated by the design-time control fully active.

Changes to the run-time text of a design-time control using an editor on the text file will be blown away the next time the design-time control is persisted. Changes to the VALUE attribute of a PARAM tag will stick. If the user strips the metadata comments and leaves the run-time text, the design-time control will not be instantiated by the AcitiveX control host when the document is reloaded. If the user deletes the run-time text, it will be regenerated the next time the control is saved. If the user deletes the endspan metadata comment, one will be implied at the end of the file.

Finally, when a client (including, for example, a web browser) retrieves the files at run-time, the design-time control information is ignored since it is wrapped inside and HTML comment and displays the run-time text. In the case where the file is processed by an active server, the control data is stripped from the file before it is processed. When the active server sees a metadata comment, it will strip the comment from the file before processing. This leaves behind just the run-time text of the design-time control. This step occurs before any other logic so the run-time text is fully active. Thus, for example, the following describes a file before it is processed by an active server:

```
<!--METADATA TYPE="DesignerControl" startspan
    <OBJECT ID=MyPageCounter
        ClassID="clsid:2FA70250-9333-11CF-8F68-00AA006D27C2">
        <PARAM Name="ImageStyle" Value="Odometer">
        <PARAM Name="TextColor" Value="Yellow">
    </OBJECT>
-->
<% Set MyPageCounter = Server.CreateObject(AXYZ.PageCounter@)
MyPageCounter.ImageStyle = 2
MyPageCounter.TextColor = Yellow
MyPageCounter.PageHits = Application("PageHits") %>
<IMG SRC=<%=MyPageCounter.ImageURL%>>
<!--METADATA TYPE="DesignerControl"endspan -->
The following describes the file after it has been processed by the
active server to remove any design-time control:
<% Set MyPageCounter = Server. CreateObject("XYZ.PageCounter")
MyPageCounter.ImageStyle = 2
MyPageCounter.TextColor = Yellow
MyPageCounter.PageHits = Application("PageHits") %>
<IMG SRC=<%=MyPageCounter.ImageURL%>>
```

As described herein, in one embodiment of the present invention the design-time control is a version of ActiveX controls. The following code fragments show a class definition for a design-time control generated by an MFC control wizard.

```
DEFINE_GUID(IID_IActiveDesigner, 0x51aaa3e0, 0x7486, 0x11cf,
0xa0, 0xc2, 0x0, 0xaa, 0x0, 0x62, 0xbe, 0x57);
#undef INTERFACE
#define INTERFACE IActiveDesigner
DECLARE_INTERFACE_(IActiveDesigner, IUnknown)
{
    // IUnknown methods
    //
    STDMETHOD(QueryInterface)(THIS_REFIID riid,
    LPVOID FAR* ppvObj) PURE;
    STDMETHOD_(ULONG,AddRef)(THIS) PURE;
    STDMETHOD_(ULONG, Release) (THIS) PURE;
    // IActiveDesigner methods
    //
    STDMETHOD(GetRuntimeClassID)(THIS_CLSID *pclsid) PURE;
```

-continued

```
    STDMETHOD(GetRuntimeMiscStatusFlags)(THIS_DWORD
*dwMiscFlags) PURE;
    STDMETHOD(QueryPersistenceInterface)(THIS_REFIID
riidPersist) PURE;
    STDMETHOD(SaveRuntimeState)(THIS_REFIID riidPersist,
REFIID riidObjStgMed,               void *pObjStgMed) PURE;
    STDMETHOD(GetExtensibilityObject)(THIS_IDispatch
**ppvObjOut) PURE;
};
const GUID IID_IActiveDesigner =
    { 0x51aae3e0, 0x7486, 0x11cf, { 0xa0, 0xc2, 0x0,
    0xaa, 0x0, 0x62, 0xbe,                         0x57 }
};
    const GUID IID_IPersistTextStream =
        {0x56223fe3, 0xd397, 0x11cf, { 0xa4, 0x2e,
    0x0, 0xaa, 0x0, 0xc0, 0x9, 0x40 }
};
    In the case of the Bgsound control, the following
    code fragments provide Bgsound as a design-time control
    of the present invention:
    class CBGSndCtrl : public COleControl
    {
        DECLARE_DYNCREATE(CBGSndCtrl)
    // Constructor
    public:
        CBGSndCtrl( );
    // Overrides
    // Classwizard generated virtual function overrides
    //{{AFX_VIRTUAL(CBGSndCtrl)
        public:
        virtual void OnDraw(CDC* pdc, const CRect&
rcBounds, const CRect& rcInvalid);
        virtual void DoPropExchange(CPropExchange* pPX);
        virtual void OnResetState( );
        virtual DWORD GetControlFlags( );
    //}}AFX_VIRTUAL
    // Implementation
        protected:
            HBITMAP m_hBitmap;
        // control properties
        short m_nLoop;
        CString m_strSource;
        // destruction
        ~CBGSndCtrl( );
        virtual HRESULT GetRuntimeText(CString& szHTML);
        DECLARE_OLECREATE_EX(CBGSndCtrl) // Class
factory and guid
        DECLARE_OLETYPELIB(CBGSndCtrl) //
GetTypeInfo
        DECLARE_OLECTLTYPE(CBGSndCtrl)      // Type
name and misc status
    // Message maps
    //{{AFX_MSG(CBGSndCtrl)
    // NOTE - ClassWizard will add and remove member
functions here.
    // DO NOT EDIT what you see in these blocks of
generated code !
    //}}AFX_MSG
        DECLARE_MESSAGE_MAP( )
    // Dispatch maps
    //{{AFX_DISPATCH(CBGSndCtrl)
    afx_msg short GetLoop( );
    afx_msg void SetLoop(short nNewValue);
    afx_msg BSTR GetSource( );
    afx_msg void SetSource(LPCTSTR lpszNewValue);
    virtual BOOL OnSetExtent(LPSIZEL lpSizeL);
    //}}AFX DISPATCH
    DECLARE_DISPATCH_MAP( )
    afx_msg void AboutBox( );
// Event maps
    //{{AFX_EVENT(CBGSndCtrl)
    //}}AFX_EVENT
    DECLARE_EVENT_MAP( )
// Interface maps
    DECLARE_INTERFACE_MAP( );
public:
    //$$$$$$$$$$$$$$$$$$$$$$$$$$DESIGNER
SPECIFIC$$$$$$$$$$$$$$$$$$$$$
    BEGIN_INTERFACE_PART(ActiveDesigner, IActiveDesigner)
```

```
        STDMETHOD(GetRuntimeClassID) (CLSID *pclsid);
        STDMETHOD(GetRuntimeMiscStatusFlags)(DWORD
            *dwMiscFlags);
        STDMETHOD (QueryPersistenceInterface)(REFIID
riidPersist);
        STDMETHOD(SaveRuntimeState)(REFIID riidPersist,
            REFIID riidObjStgMed, void
                *pObjStgMed);
        STDMETHOD (GetExtensibilityObject)(IDispatch
            **ppvObjOut);
        END_INTERFACE_PART(ActiveDesigner)
    //$$$$$$$$$$$$$$$$$$$$$$$END DESIGNER
SPECIFIC$$$$$$$$$$$$$$$$$$$$$$$$$
    // Dispatch and event IDs
    enum {
        //{{AFX_DISP_ID(CBGSndCtrl)
        dispidLoop = 1L,
        dispidSource = 2L;
        //}}AFX_DISP_ID
    };
};
```

Depending on its programming, each design-time may include non-ActiveX scripts as well. So, by instantiating the design-time control into a web page, the resulting run-time code may include both the ActiveX implementation as well as the non-ActiveX counterpart. Non-ActiveX script may include, for example, Java (by Sum Microsystems). Other non-ActiveX scripts may also be included.

It will be apparent to those skilled in the art that application of the present invention need not be utilized in conjunction with the Internet. It is also envisioned that the techniques of the present invention apply to any network using HTTP, including HTTPS-compliant networks, intranets and extranets. It is further envisioned that the techniques of the present invention apply to any text authoring situation. For example, embodiments of the present invention contemplate the use of design-time controls to assist the authoring of text-based programming languages including, for example, C++. In this regard, a C++ author who is designing an end product does not need to fully understand all the complexities of a given use of C++ by allowing the design-time control to generate the appropriate code.

Further, the present invention may also be implemented in a peer-to-peer computing environment or in a multi-user host system having a mainframe or a minicomputer. Thus, the computer network in which the invention is implemented should be broadly construed to include any client/server computer network from which a client can retrieve a remote document on a server (even if that document is available on the same machine or system).

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

We claim:

1. A computer-implemented method for authoring information for a client computer which processes the information at run-time comprising the steps of:

(a) developing a first set of instructions in an editor;

(b) incorporating a second set of instructions into said first set of instructions;

(c) storing said first set of instructions into a storage device, wherein said storing step includes the steps of:
   1. performing an operation in accordance with said second set of instructions to generate a third set of instructions, and;
   2. storing said third set of instructions along side of said second set of instructions within the saved first set of instructions,
      wherein the second set of instructions is not processed during run-time and said third set of instructions are only processed at run-time.

2. The computer-implemented method of claim 1 further comprising the step of:

(d) providing selected portions of said third set of instructions to said client.

3. The computer-implemented method of claim 1, wherein said third set of instructions control the display at run-time.

4. The computer-implemented method of claim 1, wherein said third set of instructions include script for controlling activities of a computer.

5. The computer-implemented method of claim 4, wherein said computer is said client computer.

6. The computer-implemented method of claim 4, wherein said computer is a server hosting information downloadable to said client computer.

7. The computer-implemented method of claim 1, wherein said second set of instructions, when processed, enhances a user interface during a design interval.

8. In a client/server system having at least one client computer and a server, a method of generating information for retrieval by said at least one client computer using the information during a run-time interval comprising the steps of:

(a) developing in said server a file having a first set of instructions and a control;

(b) processing during the design interval said control to generate at least one of text information and a second set of instructions; and, (c) incorporating said at least one of text information and said second set of instructions in said file,
   wherein said control is processed before said run-time interval.

9. The method of claim 8, wherein said text information is interpreted as script for implementation on at least one of said server and said client computer.

10. The method of claim 8, wherein said at least one of said text information and said second set of instructions are in hypertext mark-up language.

11. A computer capable of automatically generating information comprising in combination:

(a) authoring means for authoring a file having a first set of instructions and a control;

(b) processing means for processing said control to generate at least one of text information and a second set of instructions; and, (c) incorporating means for incorporating at least one of said text information and said second set of instructions in said file,
   wherein said control is processed before a run-time interval.

12. The computer system according to claim 11, wherein said control, when processed, enhances a user interface during a design interval.

13. A computer-readable medium having computer-executable instructions for performing steps comprising:

(a) developing a first set of instructions in an editor;

(b) incorporating a second set of instructions into said first set of instructions;

(c) storing said first set of instructions into a storage device, wherein said storing step includes the steps of:
 1. performing an operation in accordance with said second set of instructions to generate a third set of instructions, and;
 2. storing said third set of instructions along side of said second set of instructions within the saved first set of instructions,
 wherein the second set of instructions is processed before run-time and said third set of instructions are only processed at run-time.

14. The computer-readable medium of claim 13 having computer-executable instructions further comprising:

(d) providing selected portions of said third set of instructions to a client.

15. The computer-readable medium of claim 13 wherein said third set of instructions control the display during run-time.

16. The computer-readable medium of claim 13, wherein said third set of instructions include script for controlling activities of a computer.

17. The computer-readable medium of claim 16, wherein said computer is a client computer.

18. The computer-readable medium of claim 16, wherein said computer is a server hosting information downloadable to a client computer.

19. The computer-readable medium of claim 13, wherein said second set of instructions, when processed, enhances a user interface during a design interval.

20. A computer system comprising:

a first storage device for storing a control;

an editor for supporting a first platform for developing a first set of instructions and for inserting said control within said first set of instructions;

an interpreter for interpreting said control as at least one command and performing an operation in accordance with said at least one command to generate a third set of instructions; and, a second storage device for storing the output of said interpreter including said third set of instructions wherein said control is interpreted before run-time.

21. The computer system of claim 20, further comprising:

a network for providing selected portions of said third set of instructions to a client computer.

22. The computer system of claim 20, wherein said third set of instructions control the display during run-time.

23. The computer system of claim 20, wherein said third set of instructions include script for controlling activities of a computer.

24. The computer-readable medium of claim 23, wherein said computer is a client computer.

25. The computer-readable medium of claim 24, wherein said computer is a server hosting information downloadable to a client computer.

* * * * *

UNITED STATES PATENT AND TRADEMARK OFFICE
CERTIFICATE OF CORRECTION

PATENT NO. 6,035,119

DATED: March 7, 2000

INVENTORS: Jay L. MASSENA, et al.

It is certified that errors appear in the above-identified patent and that said Letters Patent is hereby corrected as shown below:

In the Detailed Description of the Preferred Embodiments, column 13, line 55, "0x51aaa3e0" should be replaced with --0x51aae3e0--.

Signed and Sealed this

Fifteenth Day of May, 2001

Attest:

NICHOLAS P. GODICI

Attesting Officer     Acting Director of the United States Patent and Trademark Office